Nov. 15, 1949     I. N. TOFTNESS     2,487,956

BASIC BALANCE SCALE

Filed Dec. 5, 1945

INVENTOR.
Irving N. Toftness.
BY Victor J. Evans & Co.
ATTORNEYS

Patented Nov. 15, 1949

2,487,956

UNITED STATES PATENT OFFICE 2,487,956

BASIC BALANCE SCALE

Irwing N. Toftness, Cumberland, Wis.

Application December 5, 1945, Serial No. 632,964

2 Claims. (Cl. 73—172)

This invention relates to a basic balance scale the primary object of the invention being to provide a scale that will give the known difference of two unknown weights applied thereto thus indicating which of the weights is the greater.

Another object of the invention is to provide a scale which will indicate to a person standing thereon which side of his body creates a greater weight on the corresponding foot of that side.

A further object of the invention is to provide a scale that is provided with two platforms for receiving the individual feet of a person for indicating the difference between the weight exerted by each foot.

A further object of the invention is to provide a scale that is simple in construction and operation and durable in use.

With the above and other objects and advantages in view the invention consists of the novel details of construction, arrangement and combination of parts more fully hereinafter described, claimed and illustrated in the accompanying drawing in which:

Figure 1:
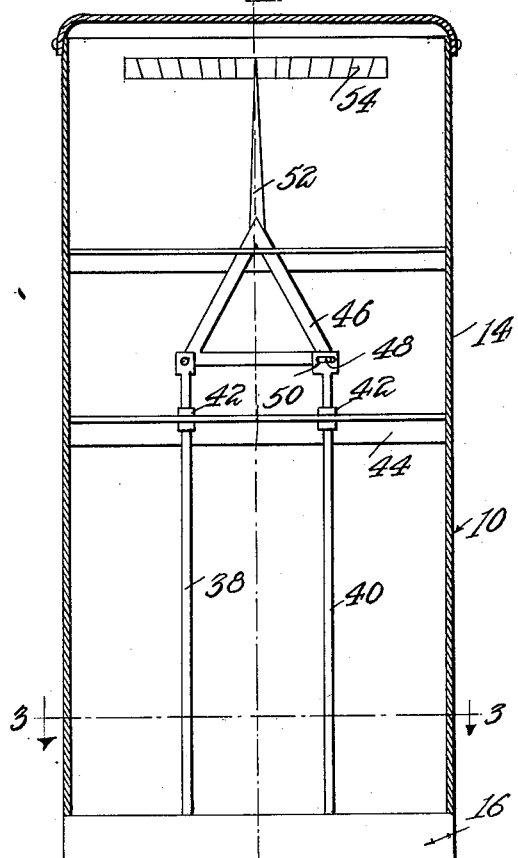
Figure 1 is an elevational view partly in section of an embodiment of the invention.
Figure 2:
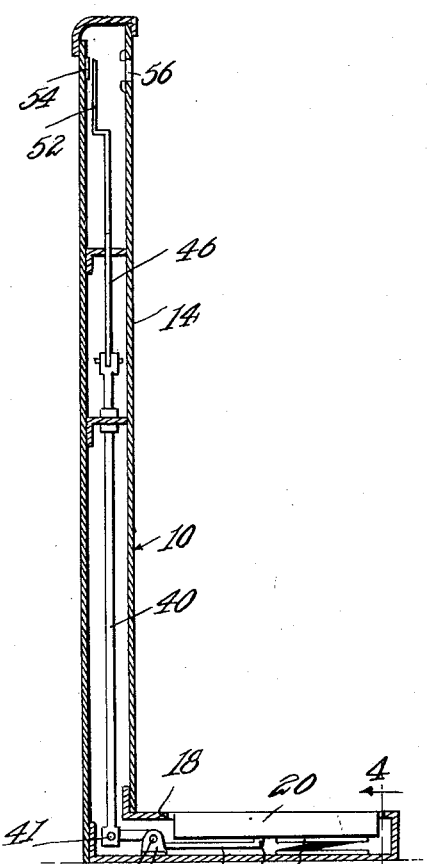
Figure 2 is a vertical sectional view on the line 2—2 of Figure 1.
Figure 3:
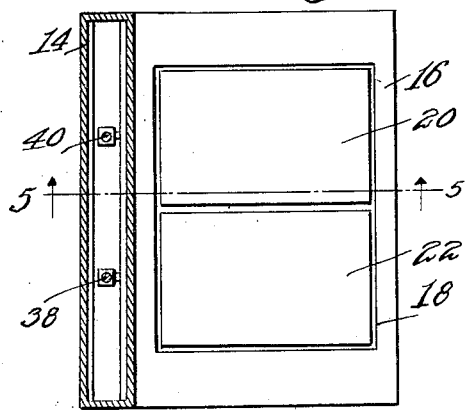
Figure 3 is a transverse sectional view on the line 3—3 of Figure 1.
Figure 4:
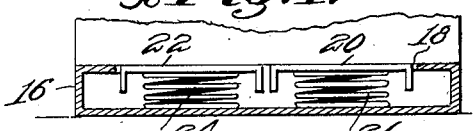
Figure 4 is a vertical section on the line 4—4 of Figure 2.
Figure 5:
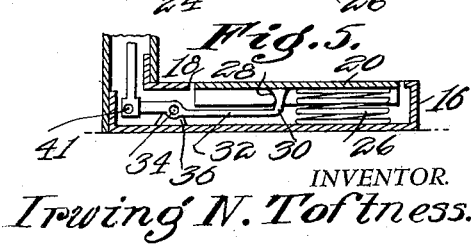
Figure 5 is a transverse sectional view on the line 5—5 of Figure 3.

Referring more in detail to the drawing the reference numeral 10 indicates the scale housing having the vertical standard portion 14 and the platform portion 16 formed at right angles thereto.

The platform portion is provided with a rectangular-shaped opening 18 to receive the treadles 20 and 22 respectively, which rest on coil springs 26 and 24 respectively. Each of the treadles is provided with a depending section 28 on the undersurface thereof from which extends an upturned end 30 of a fulcrum arm 32 which is fulcrumed at 34 by means of upstanding apertured ears 36, formed in the platform housing. Vertical rods 38 and 40 are pivotally connected to the arms 32 at 41 to the end opposite the upturned end 30 and these rods are slidably retained in bushings 42 on the transverse bar 44 connected to the outer sides of the standard portion 14 of the housing.

Rod 38 is pivotally connected to the triangular frame 46 at the lower corner thereof and a roller bearing is provided on the pivot pin to provide frictionless movement of the frame 46. The rod 40 is pivotally connected to the opposite corner of the frame 46 by means of a pin 48 which is received in the slot 50 in the upper end of the rod 40.

The apex of the frame 46 has a pointer 52 fastened thereon which traverses a calibrated scale 54 in the upper end of the standard portion and a window 56 in front of the portion 14 permits viewing of the scale.

The springs and scale work in calibrated unison to indicate the difference between the force exerted by the feet of a person standing on the treadles of the scale.

The treadle having the most weight thereon will tend to swing the indicator toward the end of scale, corresponding with the heavier weighted treadle thus indicating on which side of the person, he is the heaviest.

It is believed the operation and construction of the scale will be apparent to those skilled in the art and it is to be understood that changes may be made in the details of construction, arrangement and combination of parts without departing from the spirit of the invention or the scope of the appended claims.

Having thus described the invention what is claimed as new and desired to be secured by Letters Patent is:

1. In a basic balance scale, the combination which comprises a substantially hollow rectangular shaped platform with a treadle receiving opening in the upper surface and having a hollow vertically disposed standard at the rear, said standard having a window in the upper end, a pair of treadles positioned in the said treadle receiving opening of the platform, rearwardly disposed arms extended from points substantially in the centers of the treadles to points below the intermediate part of the standard, means pivotally mounting the arms with the treadles carried thereon in the platform thereby fulcrumming the arms at points between the treadles and standard, parallel vertically disposed rods pivotally mounted on the rear ends of the arms and extended upwardly in the said standard, and a vertically extended pointer having a base positioned in the upper end of the standard with the ends of the base pivotally connected to the upper ends of the said vertically disposed parallel rods, said pointer positioned to show through the window of the standard.

2. In a basic balance scale, the combination which comprises a substantially hollow rectangular shaped platform with a treadle receiving opening in the upper surface and having a hollow vertically disposed standard at the rear, said standard having a window in the upper end, a pair of treadles positioned in the said treadle receiving opening of the platform, rearwardly disposed arms extended from points substantially in the centers of the treadles to points below the intermediate part of the standard, means pivotally mounting the arms with the treadles carried thereon in the platform thereby fulcrumming the arms at points between the treadles and standard, parallel vertically disposed rods pivotally mounted on the rear ends of the arms and extended upwardly in the said standard, and a triangle having a base positioned in the upper end of the standard with the ends of the base pivotally connected to the upper ends of the said vertically disposed parallel rods, said triangle having a vertically extended pointer positioned to show through the window of the standard.

IRWING N. TOFTNESS.

REFERENCES CITED

The following references are of record in the file of this patent:

UNITED STATES PATENTS

| Number | Name | Date |
|---|---|---|
| 2,003,360 | Hansen | June 4, 1935 |
| 2,038,273 | Eynon | Apr. 21, 1936 |
| 2,179,822 | Imm | Nov. 14, 1939 |
| 2,335,753 | Goodman | Nov. 30, 1943 |
| 2,374,105 | Kraus | Apr. 17, 1945 |